April 3, 1951 — A. T. BARAGER — 2,547,734
COVER FOR FLEXIBLE SHAFT COUPLINGS
Filed June 25, 1949
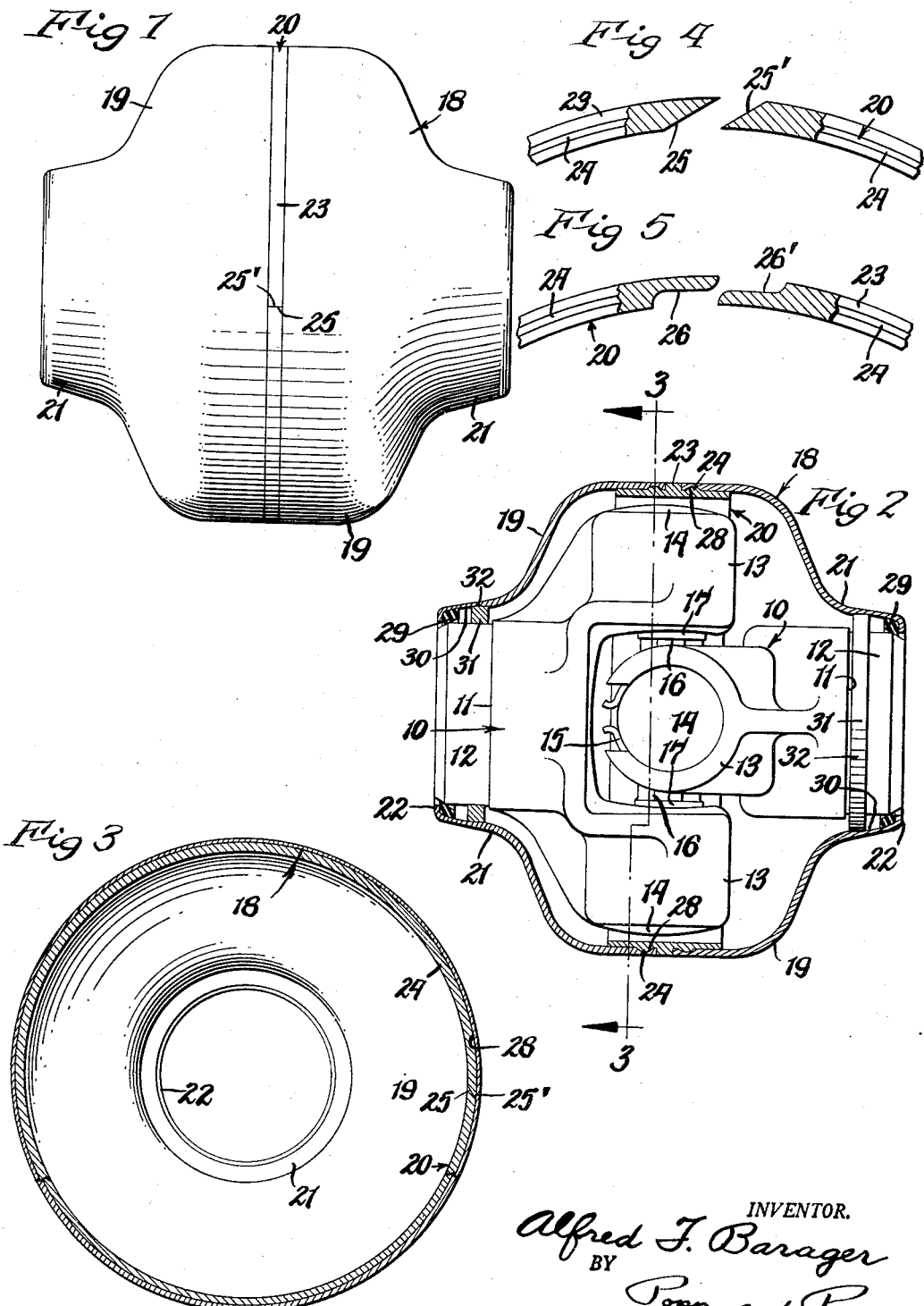
INVENTOR.
Alfred T. Barager
BY Popp and Popp
Attorneys.

Patented Apr. 3, 1951

2,547,734

UNITED STATES PATENT OFFICE 2,547,734

COVER FOR FLEXIBLE SHAFT COUPLINGS

Alfred T. Barager, Buffalo, N. Y.

Application June 25, 1949, Serial No. 101,311

7 Claims. (Cl. 64—32)

This invention relates to a cover for a flexible shaft coupling. It is an object of the invention to provide such a cover which will rotate with the coupling and permit angular movement thereof, but will not cause damage to persons or objects coming in contact therewith.

It is another object of the invention to provide such a cover which will furnish protection for the working parts of the coupling, cut down air resistance of the rotating coupling, and reduce or muffle the noise resulting from operation of the coupling.

A still further object of the invention is to provide locking means for joining tubular members which is easy to operate, provides a secure fastening, and is inexpensive to manufacture and maintain. Other objects of the invention will be perceived from the following description.

The foregoing objects are achieved in the present invention by providing a tubular cover which has only seven separate parts, fits tightly around the coupling members, and has no projecting arms, edges, or the like, which might cause damage during rotation; and by providing a locking ring for the two main portions of the cover which holds these tubular members securely together. The construction and advantages of the cover of the present invention will be made apparent from the following description taken in conjunction with the accompanying drawings.

In the drawings:

Fig. 1 is a side elevational view of the flexible shaft coupling cover of the present invention.

Fig. 2 is a longitudinal sectional view of the cover shown in Fig. 1 with the shaft coupling shown therein in operative position.

Fig. 3 is a transverse sectional view on line 3—3, Fig. 2.

Fig. 4 is a detail view, partially in section, of the joint of a split locking ring for said cover and Fig. 5 is a similar view of another type of joint for such a locking ring.

Referring to the drawings in which similar reference characters are applied to like parts and particularly to Fig. 2 of the drawings, the numerals 10 are applied to the coupling jaws of a flexible shaft coupling and which jaws are oppositely disposed and adapted to receive internally, and be fastened by any suitable means to, the ends of shafts (not shown) which it is desired to connect. Each coupling jaw 10 is provided intermediate its length with a shoulder 11 from which there extends to its outer end a reduced tubular portion 12.

At its inner end each coupling jaw 10 is provided with a pair of coupling knuckles 13 which project forwardly and outwardly on diametrically opposite sides of jaw 10. The coupling knuckles 13 attached to each jaw 10 are tubular and each carries, internally thereof, a bearing 14 which is retained in place in the arm by a spring ring 15. As will be seen from Fig. 2, in the assembled position of the coupling the knuckles of each jaw 10 are arranged in the space between the arms of the other jaw.

Between the coupling jaws 10 there is arranged a spider 16 which is, in general, cross-shaped and provided with four cylindrical portions 17 on the four arms of the cross. The cylindrical portions 17 are mounted in the bearings 14 in the knuckles 13 with the result that the jaws 10 and the shafts secured coaxially therein are free to move pivotally with respect to the spider 16 and angularly with respect to each other. Thus rotation of one shaft is transmitted through the coupling arms 13 and the spider to the other shaft, even though the two shafts are somewhat out of axial alignment.

Surrounding the above described flexible shaft coupling is a tubular cover designated generally by the numeral 18. Cover 18 comprises three principal parts. These are a pair of tubular, cup-shaped shells 19, preferably formed of pressed or spun metal, and joined by a split retaining or locking ring 20. The shells 19 are of identical construction. Each shell comprises a reduced extension 21 having an inturned flange 22 at the outer end thereof forming an orifice within which there is received the tubular portion 12 of one of the coupling jaws 10. The shells 19 are mounted on the tubular portions 12 with the larger open ends thereof in facing position and the two shells concentric.

The ring 20 is of relatively thin resilient material, preferably metal. On its circumference the split retaining ring 20 is provided with a centrally located outwardly projecting annular flange 23 and, on each side of this flange and slightly spaced therefrom, the split retaining ring is provided with an annular convex projection or bead 24. As stated before, the ring 20 is split, the adjacent ends 25, 25' being shaped, as shown in Fig. 4, to form a lapping joint by bevelling, or, as shown in Fig. 5, a scarf joint 26, 26' may be provided.

The shells 19 each have adjacent their facing large ends an internal annular groove 28 adapted to co-operate with and receive one of the beads 24 on the retaining ring 20 when the cover is assembled. In joining the shells 19 to form the cover 18, the locking ring 20, which is of slightly larger diameter than the shells 19, is radially compressed and slipped inside one of the shells. The other shell may then be slipped over the other side of the ring 20. Upon release of the compression on the ring 20, the shells will be locked together by the interfitting of the beads 24 in the grooves 28, with the facing ends of the shells abutting the flange 23 of the ring 20 and being flush with the circumference of said flange. A smooth exterior surface is thus obtained which has no projections or depressions and is consequently easily kept clean.

To disassemble the cover radial pressure is applied at a plurality of points on the flange 23 of the split retaining ring 20. The diameter of the ring is thus reduced and one or both of the shells 19 may be slipped off of the ring when the beads 24 and grooves 28 are disengaged.

In the interior of each shell 19 in the reduced extension 21 thereof, a resilient annular sealing ring 29 is provided. This sealing ring, which may be of felt or other suitable material, surrounds the corresponding end orifice of the cover and is retained in the shell by the flange 22. The sealing rings 29 are of such width as to make firm contact with the tubular portions 12 of their associated coupling jaws and serve to provide sealing means to prevent the entry of dirt or other foreign matter into the cover and, when desired, assist in retaining lubricant for the coupling within the cover.

Each shell 19 is also provided near its smaller end with an internal annular groove 30 which has been turned or ground to provide a balled or spherical surface, the center of which lies in the axis of the adjacent coupling jaw 10 within said shell. This spherical groove 30 is adapted to cooperate with one of a pair of supporting rings 31 which are slidably mounted on the reduced tubular portions 12 of the jaws 10. The supporting rings 31 are provided with ground or turned spherical peripheries 32 having the same curvature as the grooves 30 and are, therefore, able to oscillate freely within the grooves 30.

The coaction of the spherical supporting rings 31 with the spherical grooves 30 is such that when the shafts (not shown) connected by the jaws 10 are somewhat out of alignment, the supporting rings 31 will adjust themselves in the grooves 30 to maintain the cover 18 in proper position to rotate as a unit with the coupling. This results from the fact that the center of peripheral curvature of each supporting ring 31 lies in the axis of its associated jaw 10 and the centers of the spherical grooves 30 are likewise so located. Thus, when the shafts are out of alignment, the supporting rings 31 will, during rotation, oscillate slightly around the centers of their associated shafts to maintain the axis of the cover 18 in a line passing through the centers of the balled grooves. Movement of the supporting rings 31 on the tubular portions 12 is limited by the shoulders 11.

The cover of the present invention as above described is compact and sturdy. Furthermore, it employs no screws, bolts, nuts or pins, which may become loose and, therefore, rattle or be lost. It is composed of only a few parts, and is convenient to assemble and disassemble while at the same time it is securely retained in place during use.

As previously indicated, the cover performs a plurality of functions since it not only protects the coupling from dirt and other material which would interfere with its operation or cause wear of the moving parts thereof, but also protects the coupling from physical damage through contact with outside objects and prevents loss of lubricant supplied to the coupling. Furthermore, the cover also serves to reduce or deaden the noise inherent in couplings of this type, to reduce the air resistance of the rotating coupling by presenting a smooth outer surface, and to eliminate injuries which might result from persons or objects coming into contact with the coupling during rotation thereof.

The interfitting connections including the retaining or locking ring and the co-operating beads and grooves used in joining the shells 19, as above described, are capable of more general use as, for example, in coupling or joining tubular members such as pipes, conduits, or the like. As with the connection of the shells such couplings or joints will be easy to assemble and disassemble, but will provide a secure connection.

It will be perceived from the foregoing description that devices constructed in accordance with the present invention may involve many modifications of the construction illustrated and that many changes may be made without departing from the spirit of the invention. Accordingly, it is not intended that the invention shall be limited to the precise structure described and shown, but that it shall be interpreted as broadly as the appended claims will permit.

I claim:

1. A cover of the character described comprising a pair of cup-shaped shells, an annular groove on the inside surface of each of said shells adjacent the larger end thereof, and a split retaining ring inside said shells having projections received within said grooves for locking said shells together.

2. A cover of the character described comprising a pair of cup-shaped tubular shells, said shells having the larger ends thereof in facing relation, a split retaining ring of greater diameter than said shells having a portion within each of said shells, each of said shells having, adjacent its larger end, an annular interval groove and projections on said retaining ring and engaged in each of said grooves.

3. A cover of the character described comprising a pair of cup-shaped tubular shells, the larger ends of which are facing, a split retaining ring concentric with said shells having a portion thereof interposed between said facing ends, each of said shells being provided with an annular internal groove adjacent its larger end, and a bead on said retaining ring engaged in each of said grooves.

4. A cover of the character described comprising a pair of tubular concentric cup-shaped shells having their larger ends facing, each of said shells being provided with an annular groove in the interior thereof and adjacent its larger end, a split retaining ring concentric with said facing ends, beads on said ring received within said grooves, and a flange on said ring extending outwardly between said facing ends.

5. A cover of the character described comprising a pair of concentric tubular cup-shaped shells, a split retaining ring in contact with the larger ends of said shells, an annular flange projecting outwardly from said ring between said larger ends, each of said shells being provided with annular grooves on the interior of the larger ends thereof and adjacent said flanged portion of said ring, annular beads on said retaining ring engaging in said grooves, each of said shells having on the inner surface thereof adjacent its smaller end a concave spherical groove, a pair of supporting rings each having a convex periphery fitting a corresponding one of said grooves.

6. A cover for a flexible shaft coupling having a pair of flexibly connected generally parallel tubular members, comprising a pair of concentric, tubular, cup-shaped shells, retaining means interposed between said shells and having interfitting engagement with each shell, and a supporting ring carried by each of said tubular members and engaging its associated shell, each of said shells having on the inner surface thereof a concave spherical groove and each of said supporting rings having its periphery convexly curved and fitting within one of said concave spherical grooves.

7. In a coupling for tubular members, a pair of concentric tubular members with facing ends, each of said members having an internal annular groove adjacent said end, a split retaining ring of greater diameter than said tubular members, a flange on said ring and inserted within each of said tubular members, and annular bead portions on said ring and received within said grooves.

ALFRED T. BARAGER.

REFERENCES CITED

The following references are of record in the file of this patent:

UNITED STATES PATENTS

| Number | Name | Date |
| --- | --- | --- |
| 806,592 | Spicer | Dec. 5, 1905 |
| 1,943,980 | Mall | Jan. 16, 1934 |
| 2,478,890 | Barager | Aug. 16, 1949 |